(12) United States Patent
Cheng et al.

(10) Patent No.: US 11,502,329 B2
(45) Date of Patent: Nov. 15, 2022

(54) PRE-CELL FORMATION ELECTRODES AND LITHIUM ION BATTERIES

(71) Applicant: Gotion Inc., Fremont, CA (US)

(72) Inventors: Qian Cheng, Ibaraki (JP); Steven Cai, Fremont, CA (US)

(73) Assignee: Gotion, Inc., Fremont, CA (US)

( * ) Notice: Subject to any disclaimer, the term of this patent is extended or adjusted under 35 U.S.C. 154(b) by 0 days.

(21) Appl. No.: 16/986,864

(22) Filed: Aug. 6, 2020

(65) Prior Publication Data

US 2020/0365936 A1 Nov. 19, 2020

Related U.S. Application Data

(62) Division of application No. 15/961,089, filed on Apr. 24, 2018, now Pat. No. 10,826,111.

(51) Int. Cl.

| | |
|---|---|
| *H01M 10/0525* | (2010.01) |
| *H01M 10/0562* | (2010.01) |
| *H01M 4/133* | (2010.01) |
| *H01M 10/058* | (2010.01) |
| *H01M 4/1393* | (2010.01) |
| *H01M 4/02* | (2006.01) |

(52) U.S. Cl.
CPC ....... *H01M 10/0525* (2013.01); *H01M 4/133* (2013.01); *H01M 4/1393* (2013.01); *H01M 10/058* (2013.01); *H01M 10/0562* (2013.01); *H01M 2004/027* (2013.01); *H01M 2004/028* (2013.01); *H01M 2300/0065* (2013.01)

(58) Field of Classification Search
None
See application file for complete search history.

(56) References Cited

U.S. PATENT DOCUMENTS

| | | | |
|---|---|---|---|
| 2010/0297510 | A1 | 11/2010 | Kim et al. |
| 2015/0064549 | A1 | 3/2015 | Pinnell et al. |

FOREIGN PATENT DOCUMENTS

| | | |
|---|---|---|
| CN | 102224621 A | 10/2011 |
| CN | 102683746 A | 9/2012 |
| CN | 105633464 A | 6/2016 |
| CN | 105703007 A | 6/2016 |
| CN | 106505249 A | 3/2017 |

(Continued)

OTHER PUBLICATIONS

Office Action dated Jan. 14, 2022 received in Chinese Application No. 201810769215.8, 9 pages.

(Continued)

*Primary Examiner* — Daniel S Gatewood
(74) *Attorney, Agent, or Firm* — Scully, Scott, Murphy & Presser, P.C.

(57) ABSTRACT

This disclosure relates to semi-solid electrodes which are pre-formed prior to inclusion in lithium ion batteries, lithium ion batteries which incorporate the semi-solid electrodes and methods of making the semi-solid electrodes. An electrochemical cell includes a semi-solid anode formed of anode active material injected with an electrolyte and a first electrolyte additive, the semi-solid anode having a first SEI layer; and a semi-solid cathode formed of a cathode active material injected with an additional electrolyte and a second electrolyte additive, the semi-solid cathode having a second SEI layer, wherein the first electrolyte additive and the second solid electrolyte additive are different.

15 Claims, 4 Drawing Sheets

(56) References Cited

FOREIGN PATENT DOCUMENTS

CN          106935908 A     7/2017
JP          2016122597 A    7/2016

OTHER PUBLICATIONS

First Search Report dated Nov. 25, 2021 received in Chinese Application No. 201810769215.8, with partial English translation, 2 pages.
Notification to Grant Patent Right for Invention and Search Report dated May 25, 2022 received in Chinese Application No. 201810769215.8, 4 pages.

PRE-CELL FORMATION ELECTRODES AND LITHIUM ION BATTERIES

TECHNICAL FIELD

This disclosure relates to semi-solid electrodes which are pre-formed prior to inclusion in lithium ion batteries, and lithium ion batteries which incorporate the semi-solid electrodes and methods of making the semi-solid electrodes.

BACKGROUND

Lithium ion batteries typically include solid electrodes, separator, electrolytes, and ancillary components such as, for example, packaging, thermal management, cell balancing, terminals, etc. The electrodes typically comprise active materials, conductive materials, binders, and other additives.

Known methods for preparing electrodes for lithium ion batteries include coating a metallic substrate (e.g., a current collector) with a slurry composed of an active material, a conductive additive, and a binding agent dissolved or dispersed in a solvent, evaporating the solvent, and calendering the dried solid matrix to a specified thickness. The electrodes are cut, packaged with other components, saturated with electrolyte and electrolyte additives, separated and sealed to provide a conventional lithium ion battery.

After lithium ion battery assembly, an initial charging operation (referred to as a "formation process") is performed. The lithium ion battery is precisely charged and discharged at least once to provide the initial full charge of the battery. A solid electrolyte interface (SEI) is formed on the anode and/or the cathode, based on the electrolyte design, during the formation process. SEI layers are important for the cycle life, rate capability, high temperature storage, calendar life and safety of the lithium ion battery or cell. SEI layers passivate the electrode-electrolyte interfaces and prevent side reactions during battery usage.

Typically, the lithium ion battery is charged at a constant charge rate, which may be expressed as a C-rate, which represents a charge or a discharge rate equal to the capacity of a battery in one hour. SEI layer formation is enhanced at a low C-rate, which means that initial charging is typically performed over an extended period of time. The battery is charged at a low C-rate up to the fully charged voltage of the battery, which enables SEI layer formation on the carbon anode. Then, the battery is held constant at the fully charged voltage until the current drops below a threshold value. The battery is kept idle for two hours and then discharged at a small C-rate to a preset voltage, i.e., the discharge cut-off voltage. In some situations, for example, batteries that include Ni-rich cathode materials and Li-rich cathode materials, a cathode SEI is also required for low initial DCR, low DCR growth, cycle life, high temperature properties, etc. As a result, several charge and discharge cycles are needed for the formation process, which increases expense and time required for electrode synthesis.

Conventional electrolyte design uses electrolyte which include both anode and cathode electrolyte additives in the electrolyte prior to and during the formation process. Therefore, undesirable films are usually formed on either the anode or cathode or both during the formation process.

Traditional methods of electrochemical cell fabrication generally involve complicated and expensive manufacturing steps and provide electrodes which are less than 100 μM thick. Using electrodes which are less than 100 μM thick results in batteries of lower capacity, lower energy density, and a high ratio of inactive components to active materials. Furthermore, binders used in conventional electrode preparation increase tortuosity and decrease the ionic conductivity of the electrode.

Accordingly, what is needed are batteries of higher capacity, higher energy density, and higher conductivity, and methods for making such electrodes and batteries.

SUMMARY

The embodiments disclosed herein satisfies these and other needs by providing batteries of higher capacity, higher energy density and higher conductivity, which include electrodes thicker than 100 μM, undergo the formation process independently to avoid undesirable film deposition on their surface, have different SEI layers on the cathode and anode and possess a lower ratio of inactive components to active materials and methods for making such electrodes and batteries.

In one aspect, an electrochemical cell is provided. The electrochemical cell includes a semi-solid anode formed of anode active material injected with electrolyte and a first electrolyte additive which has a first SEI layer. The electrochemical cell also includes a semi-solid cathode formed of a cathode active material injected with additional electrolyte and a second electrolyte additive, which has a second SEI layer, where the first electrolyte additive and the second solid electrolyte additive are different.

In a second aspect, a method of making a semi-solid anode and a semi-solid cathode for an electrochemical cell is provided. The method includes the steps of loading an active anode material into a mold, pressing the active anode material, adding an electrolyte and a first electrolyte additive to the molded and pressed active anode material to form a semi-solid anode, and pre-forming the semi-solid anode. The method also includes the steps of loading an active cathode material into a mold, pressing the active cathode material, adding an electrolyte and a second electrolyte additive to the molded and pressed active cathode material to form a semi-solid cathode, and pre-forming the semi-solid cathode.

In a third aspect an electrochemical cell is provided that is made by adding a semi-solid cathode with a first SEI layer and a semi-solid anode with a second SEI layer to a housing, adding an electrolyte to the housing and sealing the housing.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are batteries, which include electrodes thicker than 100 µM, which undergo the formation process independently to avoid undesirable film deposition on their surface, that have different SEI layers on the cathode and anode and methods for making such batteries and electrodes.

Figure 1:
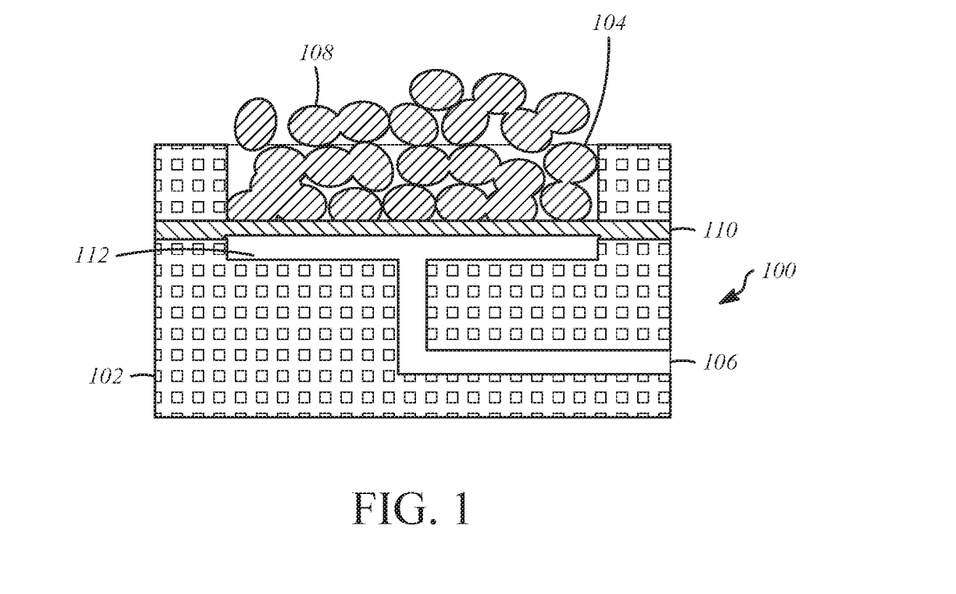
FIG. 1 illustrates a cross sectional view of the semi-solid electrode fabrication tool loaded with active material and conductive additives.

FIG. 1 illustrates a cross sectional view of the semi-solid electrode fabrication tool 100, which is used to make the semi-solid electrodes described herein. Semi-solid electrode fabrication tool 100 includes a chamber 102, which includes a mold 104 and a pipe 106. Chamber 102 is typically made of metals or nonmetal materials such as stainless steel, copper, nickel, aluminum, boron carbide, aluminum boride, silicon carbide, alumina, tungsten carbide, tungsten carbide alloy, garnet zirconia, et al. The mold 104 occupies a recess in the chamber 102 and includes the active material 108, a substrate 110, and porous media 112. Active material as used herein refers to conventional anode and cathode materials with typical conductive additives. The substrate 110 can be any inert metal but is typically stainless steel and serves as a support for pressing the active material 108 into an electrode in subsequent steps of preparing the semi-solid electrode. The porous media 112 may be any inert porous material such as, for example, porous stainless steel or polymers, which do not react with electrolytes used in subsequent steps. The pipe 106 is connected to the porous media 112 and serves as a conduit for vacuum evacuation of the chamber and electrolyte addition in later steps of preparing the semi-solid electrode.

Figure 2:
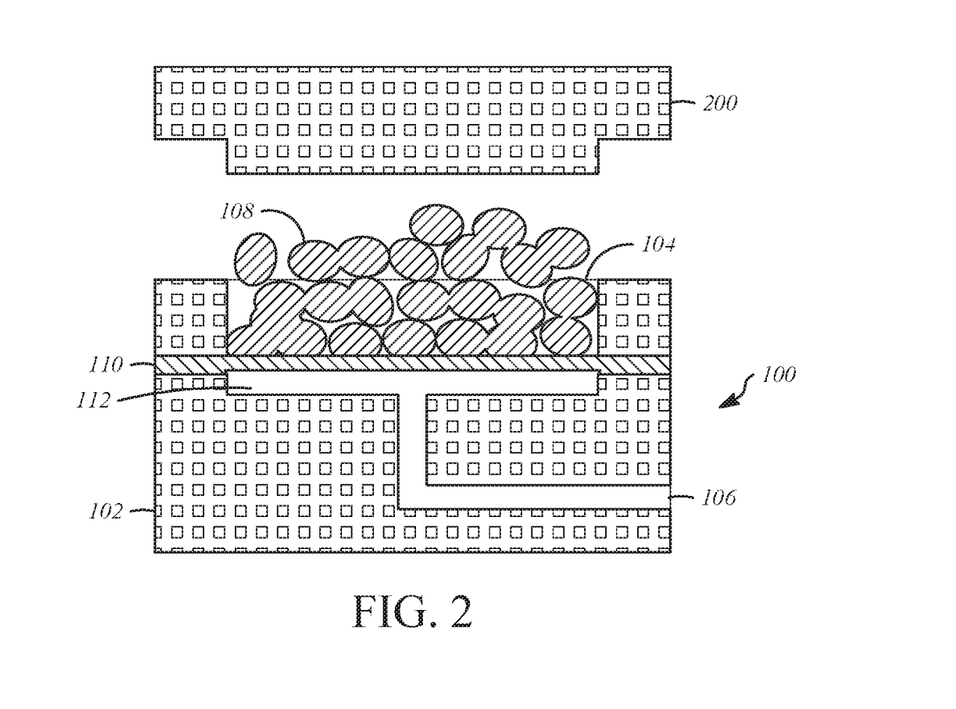
FIG. 2 illustrates a cross sectional view of the semi-solid electrode fabrication tool with a press.

FIG. 2 illustrates a cross sectional view of the semi-solid electrode fabrication tool 100 with a press 200. The press 200 is made of steel, which may be optionally coated with tungsten carbide, titanium nitride, Ti—C—N alloy, Ti—Al—N—V, Hafnium carbide, or zirconium oxide etc., to reduce adhesion and contamination and increase durability. The press may be heated at between about 50° C. and 200° C. during compression of the active material.

Figure 3:
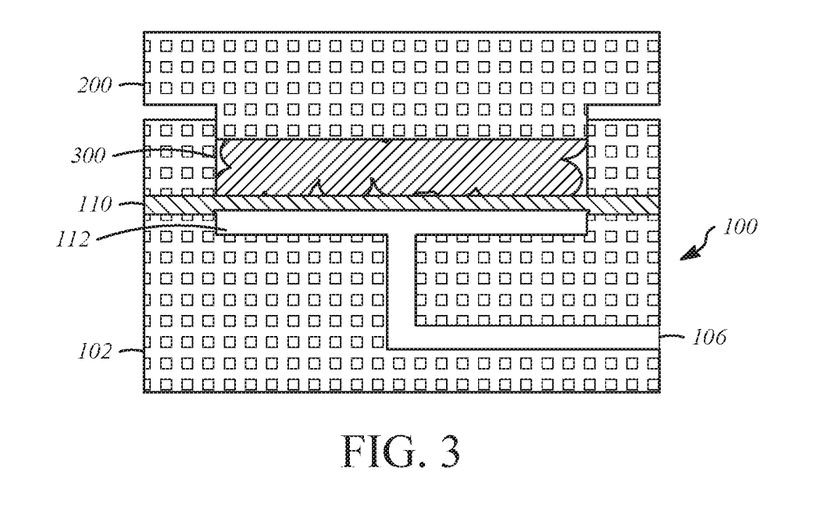
FIG. 3 illustrates a cross sectional view of the semi-solid electrode fabrication tool with the press compressing the active material.

FIG. 3 illustrates a cross sectional view of the semi-solid electrode fabrication tool 100 after the press 200 has been applied to the active material to yield the calendered electrode 300. In some implementations, the density of the anode is between about 1.1 g/cc and about 1.75 g/cc. In other implementations, the density of the cathode is between about 3.5 g/cc and about 4.2 g/cc.

Figure 4:
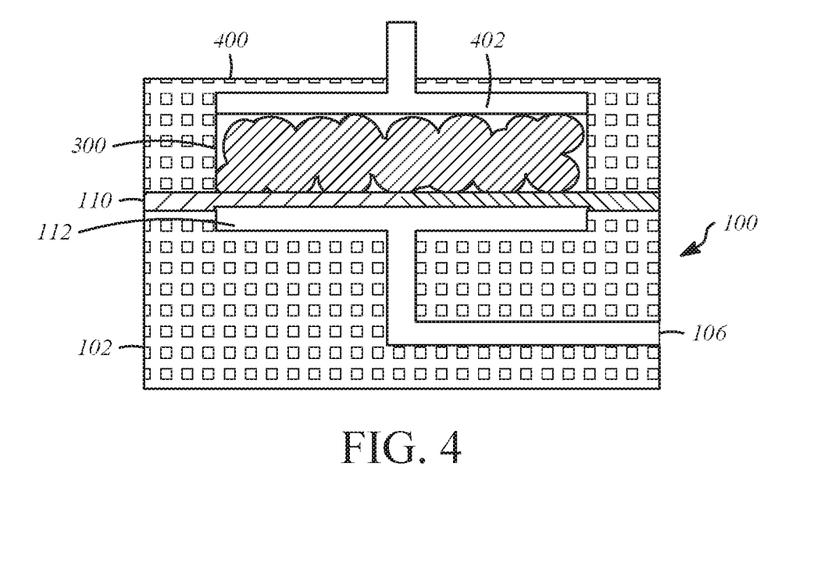
FIG. 4 illustrates a cross sectional view of the semi-solid electrode fabrication tool with a cover over the calendered electrode.

FIG. 4 illustrates a cross sectional view of the semi-solid electrode fabrication tool 100 after the press has been replaced with a cover 400 over additional porous media 402 and the calendered electrode 300. The cover 400 is made of metals or nonmetal materials such as stainless steel, copper, nickel, aluminum, boron carbide, aluminum boride, silicon carbide, alumina, tungsten carbide, tungsten carbide alloy, garnet zirconia, etc., and provides a hermetic seal over the additional porous material 402 and the calendered electrode 300. In some implementations, additional sealing material may be used to hermetically seal the cover.

Figure 5:
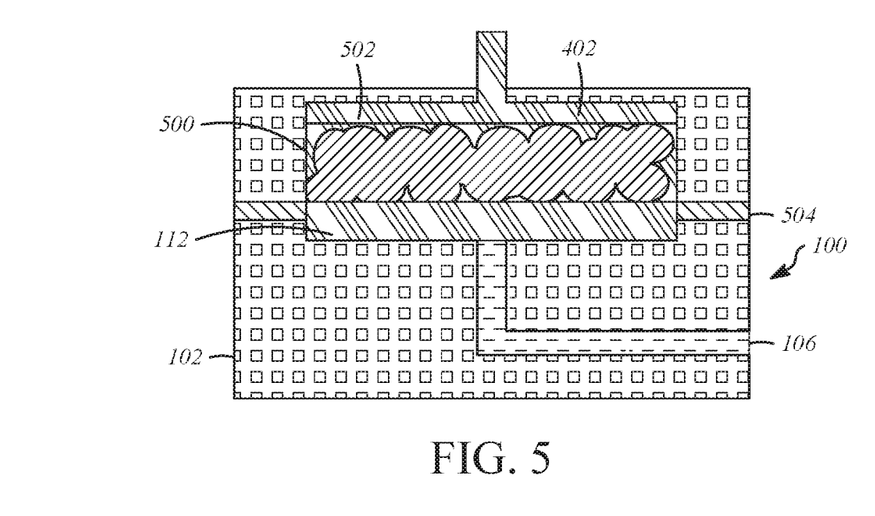
FIG. 5 illustrates a cross sectional view of the semi-solid electrode fabrication tool with a cover over the semi-solid electrode formed by injection of electrolyte and electrolyte additive.

FIG. 5 illustrates a cross sectional view of the semi-solid electrode fabrication tool 100 after removal of the substrate, addition of a sealer 504 and addition of an electrolyte with at least one electrolyte additive 502 to provide a semi-solid electrode 500. Prior to addition of the electrolyte 502, which includes an electrolyte additive, the substrate is removed, replaced by the sealer 504 which made of nitrile rubber, hydrogen nitrile rubber, silicone rubber, or flouro-silicone rubber and the interior of the fabrication tool 100 is evacuated under vacuum through the pipe 106. The electrolyte with at least electrolyte additive 502 are then injected through the pipe 106 and saturate the calendered electrode to form semi-solid electrode 500.

Figure 6:
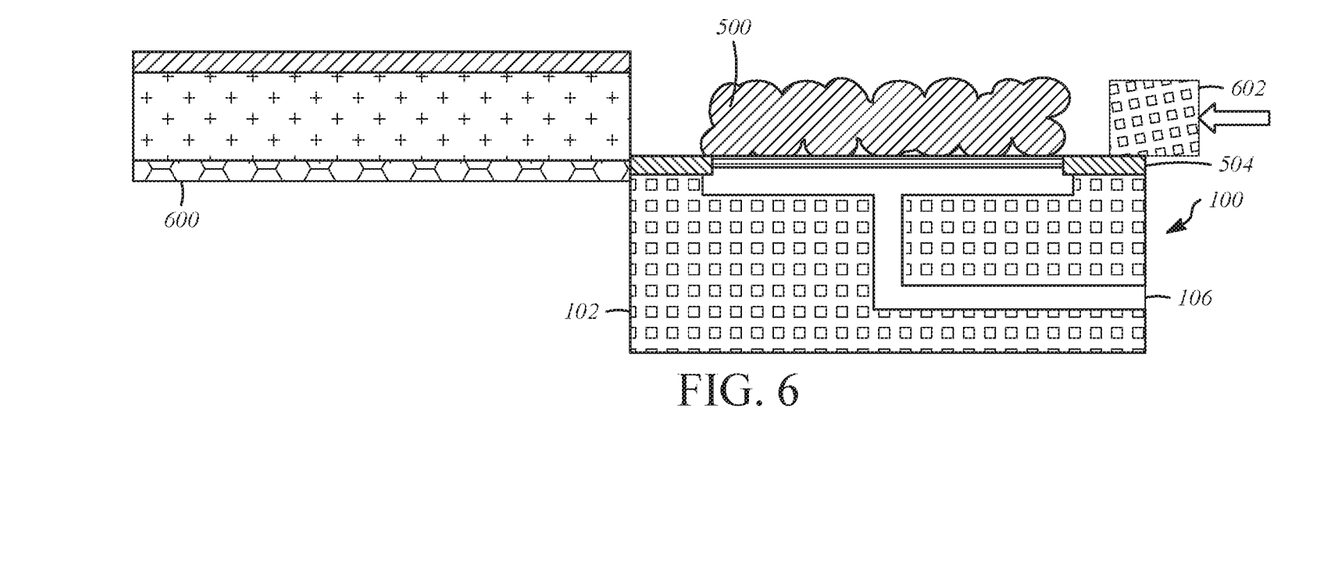
FIG. 6 illustrates a cross sectional view of insertion of the semi-solid electrode into an electrode formation process cartridge.

FIG. 6 illustrates insertion of the semi-solid electrode 500 into the electrode formation process cartridge 600 which is made of non-conductive material. An electrode brick 602 transfers the semi-solid electrode from the fabrication tool 100 (the cover and top layer of the porous material have been removed) to a process cartridge 600.

Figure 7:
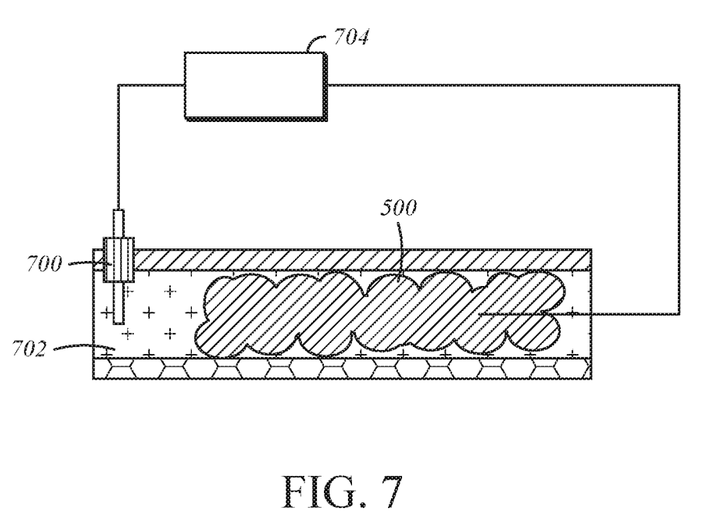
FIG. 7 illustrates a cross sectional view of the semi-solid electrode in the electrode formation process cartridge.

In one implementation, as illustrated in FIG. 7, the process cartridge 600 is equipped with a reference electrode 700 that connects with a tester 704 and the semi-solid electrode 500. The semi-solid electrode 500 is immersed in fresh electrolyte 702, which does not include an electrolyte additive, for the formation process. The reference electrode 700 and the semi-solid electrode 500 are charged and discharged at least once to form an SEI layer on the semi-solid electrode. In an alternative implementation, the semi-solid electrode, depending on the electrolyte additive, undergoes the formation process by thermal heating at a temperature between about 50° C. and about 200° C. to form the SEI layer.

The pre-formed electrode made above can be immersed in an electrolyte with a different electrolyte additive and subjected to another formation process to provide an electrode with another SEI layer different from the first SEI layer. In principle, a semi-solid anode or cathode with any number of different SEI layers or of different patterns of SEI layers may be formed using the methods described herein and may be subsequently used in an electrochemical cell.

Figure 8:
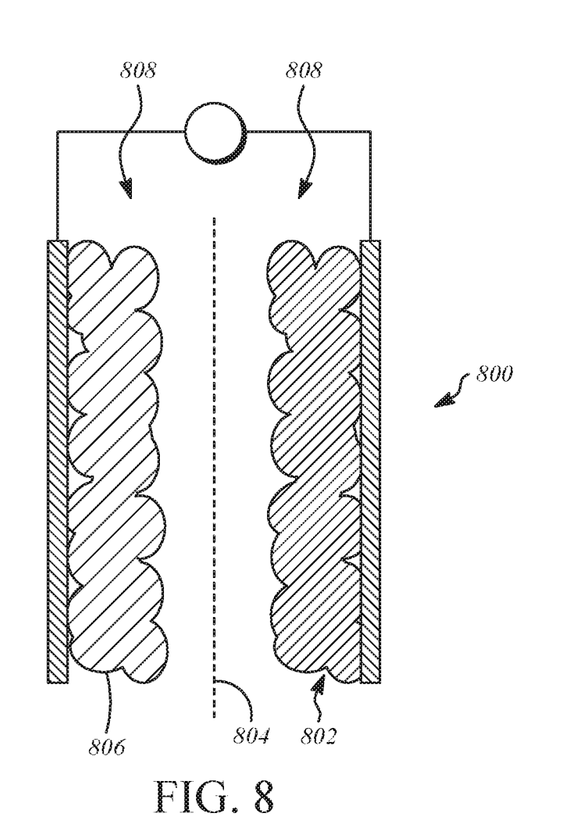
FIG. 8 illustrates a cross sectional view of an assembled electrochemical cell which includes a semi-solid anode and semi-solid cathode made by the methods described herein.

FIG. 8 illustrates an electrochemical cell 800 which includes complementary semi-solid electrodes which have independently undergone the formation process prior to inclusion into the cell. The semi-solid anode 806 has a first SEI layer whose composition is related to the electrolyte additive used during anode synthesis. The semi-solid cathode 802 has a second SEI layer whose composition is related to the electrolyte additive used during cathode synthesis. The semi-solid anode 806 and the semi-solid cathode 802 are immersed in fresh electrolyte 808 and isolated by separator 804 to provide electrochemical cell 800.

Anode active materials include, but are not limited to, lithium metal, carbon, lithium-intercalated carbon, lithium nitrides, lithium alloys with silicon, bismuth, boron, gallium, indium, zinc, tin, tin oxide, antimony, aluminum, titanium oxide, molybdenum, germanium, manganese, niobium, vanadium, tantalum, gold, platinum, iron, copper, chromium, nickel, cobalt, zirconium, yttrium, molybdenum oxide, germanium oxide, silicon oxide, silicon carbide or combinations thereof. In general, any anode material with suitable properties may be used in the electrochemical cells described herein and/or to practice the methods described herein.

Anode electrolyte additives, include but are not limited to, ammonium perfluorocaprylate (APC), vinylene carbonate (VC), vinyl ethylene carbonate (VEC), glycolide, 3-methyl glycolide, 3,6-dimethyl glycolide, 3,9-divinyl-2,4,8,10-tetraoxaspiro, diethylene glycol methyl-(3-dimethyl(trimethylsiloxy)silyl propyl)ether (EGMSPE), diethylene glycol methyl-(3-dinethyl(trimethylsiloxy)silylpropyl)-2-methyl-propyl ether (EGMSPMPE), diethyleneglycol methyl-(3-bis (trimethylsiloxy)silyl propyl)ether (EGMESPMP) and diethylene glycol-(3-methylbis(trimethylsiloxy)silyl-2-methylpropyl)ether (EGMSBPE), dimethyl acetamide (DMAc), 2,2-Dimethoxy-propane (DMP), vinyl acetate (VA), divinyl adipate (DVA) and allyl methyl carbonate (AMC), dimethyl 2-oxo-1,3-dioxolane-4,5-dicarboxylate (ODC, trimethylhexylammonium bis(trifluoromethane sulfonyl)imide (TMHA TFSI), 1-butyl-2,3-dimethylimidazolium bis(fluoromalonato)-borate (BDMImBFMB), ethylene sulfite (ES), propylene sulfite (PyS), 1,3-propane sultone (PS), butyl sultone (BS), vinyl ethylene sulfite (VES), prop-1-ene-1,3-sultone (PES), ethyl isocyanate (EtNCO), 3-fluoro-1,3-propane sultone (FPS), chloro-ethylene carbonate (Cl-EC), fluoro-ethylene carbonate (FEC), methyl chloroformate (Me-ClF), Tetrachloroethylene (TCE), Methyl phenyl bismethoxydiethoxysilane (MPBMDS), 2-vinylpyridine (VP), 1,3-propanediolcyclic sulfate (PCS), succinic anhydride (SA), methylene methanedisulfonate (MMDS), p-toluenesulfonyl isocyanate (PTSI) or combinations thereof. In general, any anode electrolyte additives with suitable properties may be used in the electrochemical cells described herein and/or to practice the methods described herein.

Cathode active materials include, but are not limited to, lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The cathode active material may also include chalcogen compounds, such as, for example, titanium disulfate or molybdenum disulfate, or combinations thereof. In some implementations, the cathode material is lithium cobalt oxide (e.g., $Li_xCoO_2$ where $0.8 \leq x \leq 1$), lithium nickel oxide (e.g., $LiNiO_2$) or lithium manganese oxide (e.g., $LiMn_2O_4$ and $LiMnO_2$), lithium iron phosphate or combinations thereof. Cathode materials can be prepared in the form of a fine powder, nano-wire, nano-rod, nano-fiber, or nano-tube. They can be readily mixed with an additional conductor such as, for example, acetylene black, carbon black, and ultra-fine graphite particles. In general, any cathode materials with suitable properties, may be used in the electrochemical cells described herein and/or to practice the methods described herein.

The cathode electrolyte additives include but are not limited to, biphenyl (BP), o-terphenyl (OT), m-terphenyl (MT), 2,2'-bithiophene (2TH), 2,2':5',2''-terthiophene (3TH), N-(triphenylphosphoranylidene) aniline (TPPA), N,N'-4,4'-diphenylmethane-bismaleimide (BMI), 2,2'-Bis[4-(4-maleimidophenoxy)phenyl]propane (BMP), o-terphenyl (OT), N'N-dimethyl-aniline (DMA), anisole (An), thioanisole (TA), respectively), adamantyl toluene (AT), 2-methyl furan (MFu), dimethyl furan (DMFu), 2-methyl thiophene (MTH), dimethyl thiophene (DMTH), tris(pentafluorophenyl)borane (TPFPB), 3,4-ethylenedioxythiophene (EDOTH), 4-(trifluoromethyl) (TFM), 4-(perfluorobutyl) (PFB), 4-(perfluorohexyl) (PFH), and 4-(perfluorooctyl) (PFO), trimethoxyboroxine (TMOBX), succinonitrile (SN), tris(trimethlysilyl) phosphite (TTSPi) or trimethylene sulfate (TMS), Lithium bis(oxalate)borate (LiBOB), 1,4-benzodiozane-6,7-diol (BDOD), lithium difluoro (oxalato)borate (LiDFOB), 1,3,2-Dioxathiolane-2,2-dioxide (DTD), Di-(2,2,2 trifluoroethyl)carbonate (DFDEC), tris(t-rimethylsilyl)borate (TMSB), and tris(trimethylsilyl)phosphate (TMSP), triphenyl phosphine (TPP), ethyl diphenylphosphinite (EDP), and triethyl phosphite (TEP), 1,3,5-trihydroxybenzene (THB), Hexamethyldisilazane, heptamethyldisilazane, tris (pentafluorophenyl) phosphine (TPFPP), Tetraethoxysilane (TEOS), N,N-diethylamino trimethylsilane (DEATMS), trimethyl borate (TMB) or combinations thereof. In general, any cathode electrolyte additives with suitable properties may be used in the electrochemical cells described herein and/or to practice the methods described herein.

Conventional conductive additives, which may be used in the semi-solid electrodes described herein, include but are not limited to, carbon particulates, graphite, carbon black, carbon nanotubes, graphene nanosheets, metal fibers, etc. or combinations thereof. In general, any conductive materials with suitable properties may be used in the electrochemical cells described herein and/or to practice the methods described herein.

In some implementations, a semi-solid electrode includes about 10% to about 70% by volume of an electrolyte. In other implementations, a semi-solid electrode includes about 30% to about 50%, about 20% to about 40% or about 25% to about 65% by volume of an electrolyte. In still other implementations, a semi-solid electrode includes a volumetric ratio of active material between about 35% and about 75%. In still other implementations, a semi-solid electrode includes a volumetric ratio of active material between about 35% and about 75% and about 0.5% to about 8% by volume of a conductive material.

Non-aqueous and polymer gel electrolytes are superior electrolytes, although any type of electrolyte can be used in the electrochemical cells described herein and/or to practice the methods described herein. Non-aqueous electrolytes are made by dissolving an electrolyte in a non-aqueous solvent. Any known non-aqueous solvent or any known electrolyte which have been used in lithium ion batteries can be employed in the methods and/or cells described herein.

In some implementations, a mixed solvent of ethylene carbonate (EC) and a second non-aqueous solvent whose melting point is lower than that of ethylene carbonate with donor number of 18 or less is the non-aqueous solvent. The mixed solvent is stable in the presence of an anode comprised of a carbonaceous material with an extensive graphite structure, suppresses the reductive or oxidative decomposition of electrolyte and has good conductivity. The second solvent includes, but is not limited to, dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene, methyl acetate (MA) or combinations thereof. In some implementations, the viscosity of the second solvent is 28 cps or less at 25° C. In other implementations, the ratio of ethylene carbonate in the solvent mixture is between about 10% to about 80%, about 20% to about 75% or about 30% to about 65% by volume.

The separator is any membrane which transports ions. In some implementations, the separator is a liquid impermeable membrane which transports ion. In other implementations, the separator is a porous polymer membrane infused with liquid electrolyte that shuttles ions between the cathode and anode materials, while preventing electron transfer. In still other implementations, the separator is a microporous membrane, which prevents particles comprising the positive and negative electrodes from crossing the membrane. In still other implementations, the separator is a single or multilayer microporous separator, which fuses above a certain temperature to prevent ion transfer. In still other implementations, the separator includes polyethyleneoxide (PEO) polymer in which lithium salt is complexed or Nafion membranes.

Semi-solid electrodes described herein are thicker (e.g., greater than about 250 μM to about 2,000 μM thick), have reduced tortuosity, and higher electronic conductivity than conventional electrodes. Other advantages over conventional electrodes include higher active material loading and a simplified manufacturing process, which is less expensive and uses less equipment of lower complexity.

The thick semi-solid electrodes described herein decrease the volume, mass, and cost contributions of inactive components with respect to active components, thereby enhancing the commercial appeal of batteries made with the semi-solid electrodes. In some implementations, the semi-solid electrodes described herein are made without binders. The volume typically occupied by binders in conventional electrodes, is instead, now occupied by electrolyte, active material and/or conductive additive. Additional electrolyte decreases tortuosity and increases the total salt available for ion diffusion, which counters salt depletion effects observed in thick conventional electrodes when used at high rate. Additional active material increases the charge capacity and density of the battery, while additional conductive additive increases the electronic conductivity of the electrode, which reduces the high internal impedance of thick conventional electrodes. Reduced tortuosity and a higher electronic conductivity of the semi-solid electrodes described herein, provides electrochemical cells with superior rate capability and charge capacity. The thickness of the semi-solid electrodes described herein, leads to a high ratio of active materials (i.e., the semi-solid cathode and/or anode) to inactive materials (i.e., the current collector and separator in conventional electrodes) which provides electrochemical cells of superior charge and energy density.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The following examples are provided for illustrative purposes only and are not intended to limit the scope of the invention.

EXAMPLES

Example 1: Preparation of Conventional Cell 1

Anode slurry was prepared by mixing natural graphite (20 μM), with carbon black, CMC (carboxymethyl cellulose) and SBR (styrene-butadiene rubber) in a weight ratio of 96:2:1:1. The slurry was coated on a Cu foil with a thickness of 10 μM and a mass loading of 90 mg/cm$^2$ on a single side and was dried at 80° C. for 30 minutes. The anode was then calendered to a density of 1.5 g/cc.

Cathode slurry was prepared by mixing $LiNi_{0.5}Co_{0.2}Mn_{0.2}$ (15 μM) with carbon black and PVDF in a weight ratio of 94:3:3. The slurry was coated on Al foil with a thickness of 15 μM and a mass loading of 180 mg/cm$^2$ on a single side and was dried at 120° C. for 30 minutes. Then, the cathode was calendered to a density of 3.7 g/cc. Single layer polypropylene with the thickness of 12 μM was used as the separator. 1M $LiPF_6$ dissolved in EC/DEC (3:7) was the electrolyte. The electrodes were assembled into an electrochemical cell with electrolyte and were subjected to the formation process.

Example 2: Preparation of Conventional Cell 2

The anode and cathode preparations were identical to the procedures described in Example 1. 1M $LiPF_6$ dissolved in EC/DEC (3:7) was the electrolyte and 1 wt % vinylene carbonate (VC) and 1 wt % succinonitrile (SN) were the electrolyte additives.

Example 3: Preparation of Conventional Cell 3

The anode and cathode preparations were identical to the procedures described in Example 1. 1M $LiPF_6$ dissolved in EC/DEC (3:7) was the electrolyte and 1 wt % vinylene carbonate (VC) and 1 wt % o-terphenyl (OT) were the electrolyte additives.

Example 4: Preparation of Conventional Cell 4

Anode slurry was prepared by mixing natural graphite (20 μM), silicone monoxide with amorphous carbon coating (10 μM) carbon black, CMC and SBR in a weight ratio of 82:10:3:2:3. The slurry was coated on a Cu foil with a thickness of 10 μM with a mass loading of 50 mg/cm$^2$ on a single side and was dried at 80° C. for 30 minutes. Then, the anode was calendered to a density of 1.5 g/cc.

Cathode slurry was prepared by mixing $LiNi_{0.5}Co_{0.2}Mn_{0.3}O_2$ (15 μM) with carbon black and PVDF in a weight ratio of 94:3:3. The slurry was coated on Al foil with a thickness of 15 μM and a mass loading of 180 mg/cm$^2$ on a single side and was dried at 120° C. for 30 minutes. Then, the cathode was calendered to a density of 3.7 g/cc. Single layer polypropylene with the thickness of 12 μM was used as the separator. 1M $LiPF_6$ dissolved in EC/DEC (3:7) was the electrolyte. The electrodes were assembled into an electrochemical cell with electrolyte and were subjected to the formation process.

Example 5: Preparation of Conventional Cell 5

The anode and cathode preparations were identical to the procedures described in Example 4. 1M $LiPF_6$ dissolved in EC/DEC (3:7) was the electrolyte and 1 wt % fluoroethylene carbonate (FEC) and 1 wt % succinonitrile (SN) were the electrolyte additives.

Example 6: Preparation of Conventional Cell 6

Anode slurry was prepared by mixing, silicone monoxide with amorphous carbon coating (10 μM), carbon black and PVDF in a weight ratio of 85:5:15. The slurry was coated on a Cu foil with a thickness of 10 μM with a mass loading of 20 mg/cm$^2$ on a single side and was dried at 120° C. for 30 minutes. Then, the anode was calendered to a density of 1.5 g/cc.

The cathode preparation was identical to the procedure described in Example 1. 1M $LiPF_6$ dissolved in EC/DEC (3:7) was the electrolyte.

Example 7: Preparation of Semi-Solid Electrode Cell 1

500 g of natural graphite (20 μm) mixed with conductive additives was loaded in the mold with a volume of 360 ml (see e.g., FIG. 1). The natural graphite was then pressed at room temperature (see e.g., FIG. 3). Porous media was added over the surface of the calendered electrode and a cover was applied over the resultant complex of porous media and electrode (see e.g., FIG. 4). The metal substrate was removed and set with spacer. The entire apparatus was vacuumed and filled with 1M $LiPF_6$ dissolved in EC/DEC 3/7 with 1 wt % VC electrolyte additive. The electrode became a semi-solid electrode after absorption of the electrolyte solution (see e.g., FIG. 5). The semi-solid anode was placed in an electrode formation process cartridge (see e.g., FIG. 6). The cartridge included an Li reference electrode connected with external tester (see e.g., FIG. 7). The anode was charged to 0 V with Li/Li+ and discharged to 1.5V with Li/Li+ at 1/10C. The electrode was handled in a dry environment and had a dew point of −70° C.

1250 g of $LiNi_{0.5}Co_{0.2}Mn_{0.3}$ (15 μm), mixed with conductive additives was loaded in the mold in a volume of 360 ml (see e.g., FIG. 1). The cathode material was then pressed at room temperature (see e.g., FIG. 3). Porous media was added over the surface of the calendered electrode and a cover was applied over the resultant complex of porous media and electrode (see e.g., FIG. 4). The metal substrate was removed and set with spacer, the entire apparatus was vacuumed and filled with 1M $LiPF_6$ dissolved in EC/DEC 3/7 with 1 wt % SN electrolyte additive. The electrode became a semi-solid electrode after absorption of the electrolyte solution (see e.g., FIG. 5). The electrolyte injected semi-solid anode was placed in the electrode formation process cartridge (see e.g., FIG. 6). The cartridge included a Li metal reference electrode connected with external tester (see e.g., FIG. 7). The cathode was charged to 2.5V with Li/Li+ and discharged to 4.25V with Li/Li+ in 1/10C. The electrode was handled in a dry environment and had a dew point of −70° C. The electrodes after completion of the formation process were assembled into an electrochemical cell with fresh electrolyte (see e.g., FIG. 8).

Example 8: Preparation of Semi-Solid Electrode Cell 2

The anode preparation was identical to the procedure described in Example 7. The cathode preparation was identical to the procedure, described in Example 7, except that the electrolyte additive was 1 wt % OT.

Example 9: Preparation of Semi-Solid Electrode 3

The anode preparation was identical to the procedure described in Example 7. The cathode preparation was identical to the procedure described in Example 7, except that the electrolyte additive was 1 wt % DMA.

Example 10: Preparation of Semi-Solid Electrode 4

The anode preparation was identical to the procedure described in Example 7, except that the electrolyte additive was 1 wt % PS. The cathode preparation was identical to the procedure described in Example 7.

Example 11: Preparation of Semi-Solid Electrode 5

The anode preparation was identical to the procedure described in Example 7, except that the anode powder was prepared by mixing natural graphite (20 μM), silicone monoxide with amorphous carbon coating (10 μM) and carbon black in the weight ratio of 87:10:3. The semi-solid anode was absorbed with M $LiPF_6$ EC/DEC 3/7 with 1 wt % FEC as electrolyte additive. The cathode preparation was identical to the procedure described in Example 7.

Example 12: Preparation of Semi-Solid Electrode 6

The anode preparation was identical to the procedure described in Example 7, except that the anode powder was prepared by mixing natural graphite (20 μM), silicone monoxide with amorphous carbon coating (10 μM) and carbon black in the weight ratio of 87:10:3. The semi-solid anode was absorbed with 1M $LiPF_6$ EC/DEC 37 with 1 wt % $LiPO_2F_2$. The cathode preparation was identical to the procedure described in Example 7.

Example 13: Preparation of Semi-Solid Electrode 7

The anode preparation was identical to the procedure described in Example 7, except that the anode powder was prepared by mixing, silicone monoxide with amorphous carbon coating (10 μM) and carbon black in the weight ratio of 90:10. The semi-solid anode was absorbed with 1M $LiPF_6$ EC/DEC 3/7 with 1 wt % FEC. The cathode preparation was identical to the procedure described in Example 7.

Example 14: Measurement of Electrochemical Properties

Conventional methods were used to measure coulombic efficiency, energy density and direct current resistance (DCR) of electrochemical cells.

Storage retention tests were performed as follows. An electrochemical cell at a fully charged state at 4.25V, underwent a C/3 discharge and a charge test to 2.5V. Then, an electrochemical cell at a fully charged state at Vmax, was discharged to a voltage corresponding to Vnominal at 30° C. using a C/3 constant current rate. The cell was placed in a thermal temperature chamber which was brought to 60° C. within 15 minutes and then soaked at an open circuit for 48 hours. The cell was then cooled to 30° C. and allowed to rest for at least 4 hours before being brought to a fully charged state at 4.25V, discharged at C/3 rate and charged again. The storage retention test was characterized by the capacity ratio after hot storage compared with the initial state.

Cycle life testing was performed as follows. The electrochemical cell was fully charged at 30° C. in 1/3C CC (constant current) 1/50C CV (constant voltage) to 4.25V and rest at OCV (open circuit voltage for 1 h). The device is fully discharged at 30° C. in 1/3C CC to 2.5V. These steps were repeated for 1500 cycles with recording of every discharge capacity. The capacity retention ratio was calculated by the discharge capacity at each cycle divided by the capacity in step 2.

Rate testing was performed as follows. The electrochemical cell was charged at 30° C. to 4.25V in 1/3C CC 1/50C CV and discharged to 2.5V in 1/3C. The charge and discharge cycles was repeated at 0.5C, 1C, 2C, 3C, 5C, 6C, 8C and 10C. The rate capability was characterized by the discharge capacity of each rate to the capacity recorded in the second step.

The electrochemical properties of cells formed by conventional electrodes are summarized in Table 1. During the conventional formation process the electrolyte additive was present at both electrodes and may react at both the cathode and anode to form undesirable films on the electrode surfaces (Examples 1-6). Similarly, the electrochemical properties of cells formed by semi-solid electrodes are summarized in Table 2. Note that the semi-solid anode and semi-solid cathode of the cells were formed independently with different electrolyte additives and have different SEI layers on the electrode surface.

TABLE 1

| Example No. | Electrolyte additives | Coulombic efficiency (%) | Energy density (Wh/L) | DCR (mOhm) | Cycle retention (%) | Storage retention (%) | 1 C rate (%) | 3 C rate (%) |
|---|---|---|---|---|---|---|---|---|
| Example 1 | None | 93 | 440 | 20 | 57 | 87 | 89 | 72 |
| Example 2 | VC, SN | 94 | 440 | 21 | 73 | 87 | 87 | 72 |
| Example 3 | VC, 1 wt % OT | 94 | 440 | 22 | 72 | 86 | 87 | 71 |
| Example 4 | None | 87 | 520 | 46 | 34 | 79 | 82 | 61 |
| Example 5 | 1 wt % FEC, 1 wt % SN | 89 | 520 | 48 | 46 | 80 | 85 | 65 |
| Example 6 | None | 71 | 690 | 370 | 3 | 72 | 65 | 36 |

TABLE 2

| Example No. | Anode additive | Cathode additive | Coulombic efficiency (%) | Energy density (Wh/L) | DCR (mOhm) | Cycle retention (%) | Storage retention (%) | 1 C rate (%) | 3 C rate (%) |
|---|---|---|---|---|---|---|---|---|---|
| Example 7 | VC | SN | 99 | 440 | 89 | 85 | 93 | 96 | 82 |
| Example 8 | VC | OT | 99 | 440 | 90 | 86 | 94 | 93 | 83 |
| Example 9 | VC | DMA | 98 | 440 | 92 | 89 | 92 | 93 | 83 |
| Example 10 | PS | SN | 98 | 440 | 78 | 83 | 93 | 92 | 81 |
| Example 11 | FEC | SN | 97 | 520 | 120 | 75 | 89 | 86 | 75 |
| Example 12 | $LiPO_2F_2$ | SN | 97 | 520 | 98 | 73 | 89 | 89 | 76 |
| Example 13 | FEC | SN | 95 | 690 | 178 | 50 | 84 | 72 | 58 |

What is claimed is:

1. A method of making a semi-solid anode and a semi-solid cathode for an electrochemical cell comprising:
    loading an active anode material into a mold;
    pressing the active anode material;
    adding an electrolyte and a first electrolyte additive to the molded and pressed active anode material to form a semi-solid anode;
    pre-forming the semi-solid anode;
    loading an active cathode material into a mold;
    pressing the active cathode material;
    adding an electrolyte and a second electrolyte additive to the molded and pressed active cathode material to form a semi-solid cathode; and
    pre-forming the semi-solid cathode.

2. The method of claim 1, wherein the semi-solid anode is pre-formed by heating the semi-solid anode at between about 50° C. and 200° C., the pre-forming producing a first SEI layer on the semi-solid anode dependent on the first electrolyte additive, wherein the pre-formed semi-solid anode is configured for inclusion in an electrochemical cell.

3. The method of claim 1, wherein the semi-solid anode is pre-formed by using a reference electrode to charge and discharge the semi-solid anode and the reference electrode, the pre-forming producing a first SEI layer on the semi-solid anode, wherein the pre-formed semi-solid anode is configured for inclusion in an electrochemical cell.

4. The method of claim 1, wherein the semi-solid cathode is pre-formed by heating the semi-solid cathode at between about 50° C. and 200° C., the pre-forming producing a second SEI layer on the semi-solid cathode, wherein the pre-formed semi-solid cathode is configured for inclusion in an electrochemical cell.

5. The method of claim 1, wherein the semi-solid cathode is pre-formed by using a reference electrode to charge and discharge the semi-solid cathode and the reference electrode, the pre-forming producing a second SEI layer on the semi-solid cathode, wherein the pre-formed semi-solid cathode is configured for inclusion in an electrochemical cell.

6. The method of claim 3, wherein the semi-solid anode is charged and discharged at a C-rate of less than 1/5.

7. The method of claim 3, wherein the semi-solid anode is charged and discharged at a temperature between about 50° C. and about 200° C.

8. The method of claim 5, wherein the semi-solid cathode is charged and discharged at a C-rate of less than 1/5.

9. The method of claim 5, wherein the semi-solid cathode is charged and discharged at a temperature between about 50° C. and about 200° C.

10. The method of claim 1, wherein the active anode material is pressed at a temperature between about 50° C. and about 200° C.

11. The method of claim 1, wherein the active cathode material is pressed at a temperature between about 50° C. and about 200° C.

12. The method of claim 1, wherein the first electrolyte additive is ammonium perfluorocaprylate, vinylene carbonate, vinyl ethylene carbonate, glycolide, 3-methyl glycolide, 3,6-dimethyl glycolide, 3,9-divinyl-2,4,8,10-tetraoxaspiro, diethylene glycol methyl-(3-dimethyl(trimethylsiloxy)silylpropyl)ether, diethylene glycol methyl-(3-dinethyl(trimethylsiloxy)silylpropyl)-2-methylpropyl ether, diethyleneglycol methyl-(3-bis(trimethylsiloxy)silylpropyl)ether, diethylene glycol-(3-methylbis(trimethylsiloxy)silyl-2-methylpropyl)ether, dimethyl acetamide, 2,2-dimethoxypropane, vinyl acetate, divinyl adipate, allyl methyl carbonate, dimethyl 2-oxo-1,3-dioxolane-4,5-dicarboxylate, trimethylhexylammonium bis(trifluoromethane sulfonyl) imide, 1-butyl-2,3-dimethylimidazolium bis(fluoromalonato)-borate, ethylene sulfite, propylene sulfite, 1,3-propane sultone, butyl sultone, vinyl ethylene sulfite, prop-1-ene-1,3-sultone, ethyl isocyanate, 3-fluoro-1,3-propane sultone, chloro-ethylene carbonate, fluoro-ethylene carbonate, methyl chloroformate, tetrachloroethylene, methyl phenyl bismethoxydiethoxysilane, 2-vinylpyridine, 1,3-propanediolcyclic sulfate, succinic anhydride, methylene methanedisulfonate, p-toluenesulfonyl isocyanate or combinations thereof.

13. The method of claim 1, wherein the second electrolyte additive is biphenyl, o-terphenyl, m-terphenyl, 2,T-bithiophene, 2,2': 5', 2"-terthiophene, N-(triphenylphosphoranylidene) aniline (TPPA), N,N'-4,4'-diphenylmethane-bismaleimide, 2,2'-bis[4-(4-maleimidophenoxy)phenyl] propane, o-terphenyl, N'N-dimethyl-aniline, anisole, thioanisole, adamantyl toluene, 2-methyl furan, dimethyl furan, 2-methyl thiophene, dimethyl thiophene, tris(pentafluorophenyl)borane, 3,4-ethylenedioxythiophene, trifluoromethane, perfluorobutane, perfluorohexyl, perfluorooctane, trimethoxyboroxine, succinonitrile, tris(trimethlysilyl) phosphite, trimethylene sulfate, lithium bis(oxalate)borate, 1,4-benzodiozane-6,7-diol, lithium difluoro(oxalato)borate, 1,3,2-dioxathiolane-2,2-dioxide, Di-(2,2,2 trifluoroethyl) carbonate, tris(trimethylsilyl)borate, tris(trimethylsilyl) phosphate, triphenyl phosphine, ethyl diphenylphosphinite, and triethyl phosphite, 1,3,5-trihydroxybenzene, hexamethyldisilazane, heptamethyldisilazane, tris (pentafluorophenyl) phosphine, tetraethoxysilane, N,N-diethylamino trimethylsilane, trimethyl borate or combinations thereof.

14. A method of making an electrochemical cell comprising the steps of claim 1, and further comprising:
adding the semi-solid cathode and the semi-solid anode to a housing;
separating the semi-solid cathode and semi-solid anode;
adding an electrolyte to the housing; and
sealing the housing.

15. A method of making and electrochemical cell comprising:
adding a semi-solid cathode with a first SEI layer and a semi-solid anode with a second SEI layer to a housing;
separating the semi-solid cathode and semi-solid anode;
adding an electrolyte to the housing; and
sealing the housing.

* * * * *